3,197,189
DOCK FENDERS
Stephan J. Pemper, West Allis, and James J. Pemper, Milwaukee, Wis. (both of 1638 W. Pierce St., Milwaukee, Wis.)
Filed Oct. 15, 1963, Ser. No. 316,319
6 Claims. (Cl. 267—1)

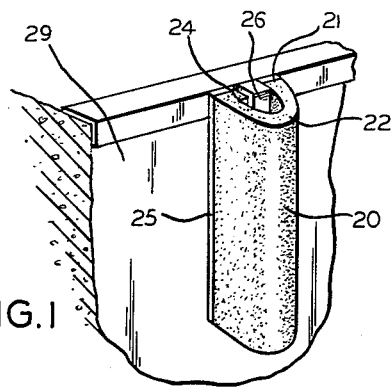
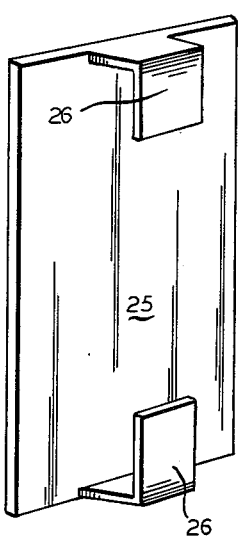
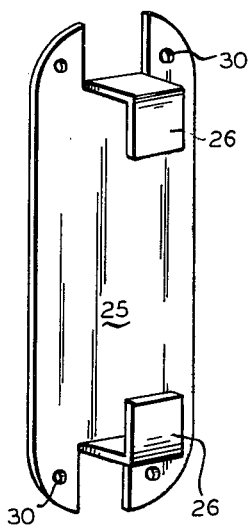
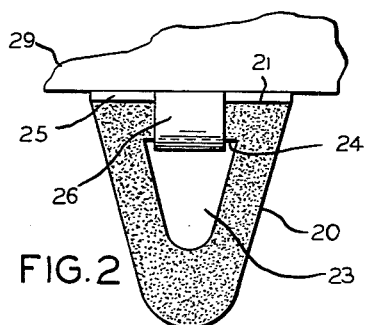
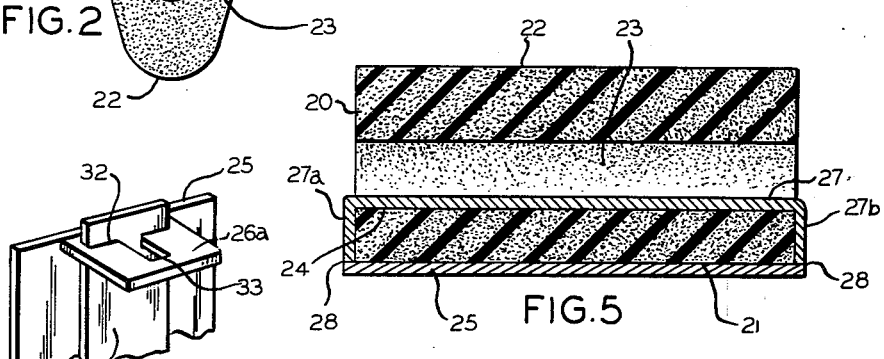
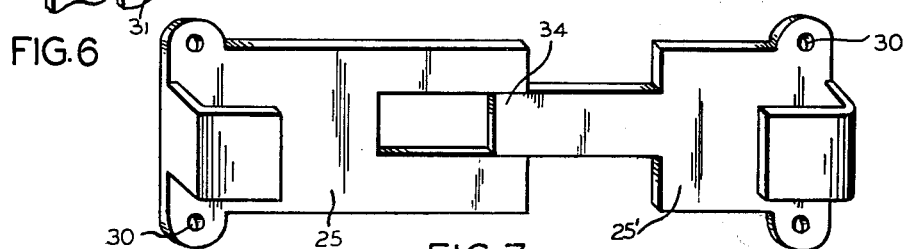
INVENTORS
STEPHAN J. PEMPER
JAMES J. PEMPER

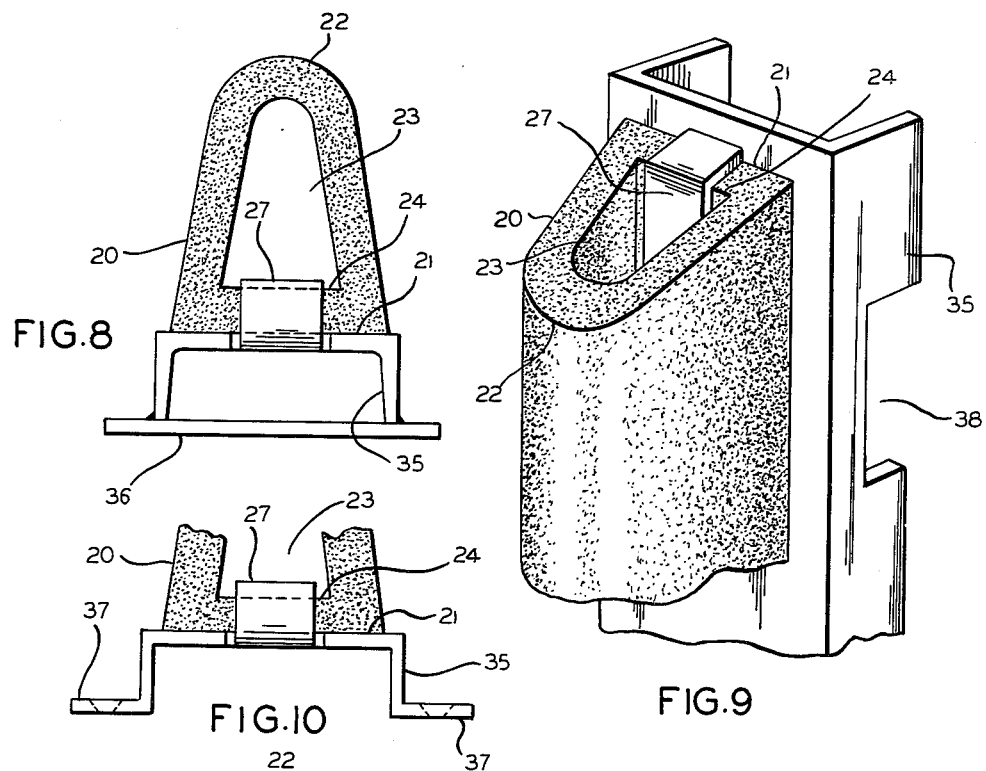
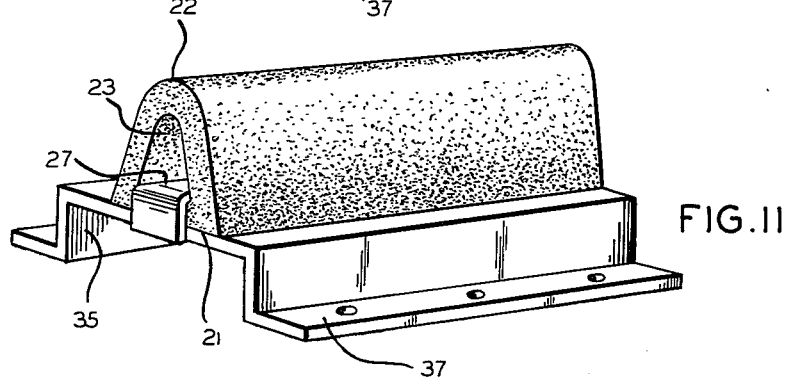
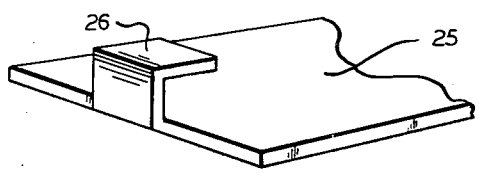
INVENTORS
STEPHAN J. PEMPER
JAMES J. PEMPER

Our invention relates to dock fenders, and more particularly to resilient bumper members designed to absorb any contact shock due to engagement of a vehicle such as a truck or the like, with a permanent or fixed object such as a loading dock or the like.

It is manifest to anyone familiar with the loading and unloading of trucks at platforms or docks, that it is quite frequently a hazard to have the truck or the like, jarred when coming into contact with the platform, causing disarrangement of the merchandise on the truck, or even breaking the edge of the dock. With the device herein illustrated and described it is possible to cushion the impact thereby protecting both the dock and the vehicle. It is also feasible and practical to attach assembled units as herein disclosed directly on the truck for its protection when coming in contact with any other fixed object.

The prime object of our invention is to provide a device of the character described that is easily fabricated and easily attached to a dock or to an automotive vehicle for the cushioning function, while being compressible to a small portion of its original dimensions, thereby allowing a gradual slowdown of the object providing the shock force while the device absorbs the forces.

Another object of our invention is to construct such a device in a manner which retains resilient cushioning material constituting a contact portion of the device in an expanded condition ready for absorption of the shock when contact is made between the vehicle and the dock.

The device is simple in construction, economical and easy to attach, and highly efficient for the purpose for which it is intended.

Other and further objects of our invention will become more apparent as the description proceeds, when taken in conjunction with the drawings, in which:

FIGURE 1 is a perspective view of the device constituting our invention, attached to the face of a loading dock or the like;

FIGURE 2 is a top view of the device shown in FIGURE 1;

FIGURE 3 is a perspective view of a back plate of rectangular shape for attachment to the dock by means of welding or the like;

FIGURE 4 is a similar view of modified construction equipped with apertures for mounting the entire unit with screws or bolts;

FIGURE 5 is a longitudinal cross sectional view of another modification of the assembled device shown in FIGURES 1 and 2;

FIGURE 6 is a fragmentary perspective view of the end of a modified mounting plate and retaining bar;

FIGURE 7 is another modified construction of the plate made up in two sections adjustably engaging one another, and equipped with apertures for mounting;

FIGURE 8 is an end view of the device equipped with a channel welded to a mounting plate;

FIGURE 9 is another modified construction showing the channel having its webs cut out to accommodate any uneven construction on the face of the dock;

FIGURE 10 is a fragmentary end view of the device constructed as a channel having outwardly extending flanges to accommodate bolts or screws for its mounting;

FIGURE 11 is a perspective view of the device shown in FIGURE 10; and

FIGURE 12 is a perspective end view of a portion of the plate as shown in FIGURE 3.

Similar characters of reference indicate corresponding parts throughout the several views, and referring now to the same, the character 20 designates a bumper constructed of pliable material such as rubber, plastic, or any other type of molded, resilient material. This bumper unit 20 has one side wall providing a flat surface and an oppositely disposed curvilinear shaped surface 22. The entire bumper is integrally formed and is shown with an elongated opening 23 extending longitudinally therethrough, thereby providing a generally tubular cross section. It is shaped in a manner to provide an inner flat surface 24.

The above described pliable bumper 20 is mounted on a mounting plate 25, the rear side of which may be attached to a support such as a dock. The other side of plate 25 has spaced, outwardly extending and angularly formed retaining or clamping members 26. The angular retaining members 26 may be replaced with a single longitudinal bar 27 in FIGURE 5, which bar 27 extends the entire length of the bumper 20, and which has angularly extending ends 27a and 27b which overlie the opposite ends of the flat side wall and which may be attached by welding at 28 or the plate 25. The plate 25 may be attached to the dock 29 in FIGURE 1 by means of welding, or the plate 25 may be equipped with a plurality of apertures 30 to accommodate screws or bolts (not shown) for the mounting of the entire assembled unit to the dock 29.

The mounting plate 25 and bumper clamping elements may be of varied design as shown in the various drawings. In FIGURE 6 we show a means of removably attaching a longitudinal retaining bar 31, similar in function to bar 27, by providing bar 31 with spaced recesses 32 which receive the angles 26a. The portion of the bar 31 between the recesses rides in slots 33 in the members 26a. When the retaining bar 31 is turned within the opening 23 inside of the bumper 20, it may be removed through the slots 33 and then be reinserted. In FIGURE 7 the base plate is adjustable in length through use of a sectionally formed plate consisting of plates 25 and 25', slidably engaging one another at 34 to allow for variation in the length of the bumper 20.

In FIGURE 8 we show a base plate of channel form having rearwardly extending and spaced legs 35 acting as a support. The base plate has a bumper retaining means such as the longitudinal retaining bar 27 welded thereto at both its ends. The channel legs 35 may be mounted on an additional flat plate 36 for attachments to the dock 29. In FIGURE 10, we show a similar construction but without the plate 36 and the channel legs 35 being provided with outwardly disposed flanges 37 to accommodate mounting screws or bolts (not shown).

Another modification is shown in FIGURE 9 in which the channel legs 35 are provided with cutout portions 38, where desired, to take care of any variations in the surface configuration face of the dock 29, while permitting the unit to be attached in any convenient and efficient manner.

In each form of the invention the tubular bumper element is snugly and firmly held by the base plate, which is mounted on a dock or on some exposed part of a vehicle. By reason of the bearing engagement of the flat surfaces of the base plate and the tubular bumper element, the bumper element is held firmly in position. The curvilinear and outwardly facing contact surface of the bumper together with the shape of the walls of the element provide good qualities of resiliency and compressibility when encountering or absorbing shock. In this regard it may be noted that the relatively large hollow interior space of the element allows the curvilinear exposed wall to yield laterally from side to side. When encountering shock loads that are inclined to the general plane of the plate 25, the outermost portion of the element may be bent laterally toward a position where the interior walls of the bumper element are very close to one another. When encountering a shock force moving perpendicularly to the base plate 25, the outer exposed wall may yield inwardly towards the plate 25 and toward a position where the interior walls of the element are very close to one another.

The generally outward convex and tapered shape of the bumper is advantageous in terms of allowing the deflection as aforesaid while providing a relatively large base area for distribution of the shock forces to and through the support.

To provide adequate flexibility and compressibility, while still having some degree of rigidity, it is advantageous to provide a substantially uniform wall thickness for the bumper, while the wall thickness is less than the width of the opening within the bumper. It is advantageous to have the width of this opening, taken perpendicular to the surface 21, on the order of twice the wall thickness of the bumper or more, as is illustrated in FIGURE 8, while the dimension taken in a direction parallel to the surface 21 and adjacent to the surface is approximately twice the wall thickness or more.

Bumpers, as herein disclosed, may be advantageously cut to desired lengths from elongated, substantially continuous, extruded tubes of rubber or rubber-like material.

The article is easily assembled merely by bringing the rear flat face of the bumper against the flat face of the base and fixing it in position through use of one of the clamping instrumentalities disclosed herein. When using the clamping elements of FIGURES 3, 4 or 12, one end of the bumper may be inserted into one of the clamping elements so that the rear wall thereof is engaged between the element and the base, the bumper is then bent so that the opposite end may be slipped beneath the other element. When so inserted, the bumper element is ready for mounting. Use of clamping facilities of the type shown in FIGURES 3, 4 or 12 allows easy removability and replaceability of bumpers when they become worn.

The bumper assembly may be made to any appropriate length simply by making the base plates and bumpers of the desired length. The form of base plate illustrated in FIGURE 7 is advantageous in terms of providing a desired length.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A fender for docks and the like including a generally elongated support, said support including a base plate, means formed and adapted for fastening said base plate to a further support positioned laterally to one side of said base plate, clamping means fixed to the other side of said base plate, said clamping means including spaced, tongue-like elements projecting from said other side of said base plate and extending toward one another, and an elongated, hollow bumper element of resilient material removably received within said tongue-like elements with said tongue-like elements projecting within the hollow portions of said element, said element being positioned against said other side and being removably insertable within said tongue-like elements by bending of said bumper element for engagement and disengagement with said tongue-like elements.

2. A fender for docks and the like including a generally elongated support, said support including a base plate, means formed and adapted for fastening said base plate to a further support positioned laterally to one side of said base plate, clamping means fixed to the other side of said base plate, said other side being flat, and an elongated, hollow, bumper element of resilient material having one side wall presenting a flat surface in abutting contact with said other side of said base plate, said element having an outwardly extended curvilinear wall joined to the opposite sides of said first named wall and being integral therewith, said curvilinear wall being tapered when viewed in cross section so that the width of said element, taken parallel with said flat surface, diminishes from said flat surface to said outer portion of said curvilinear wall, said clamping means including portions integrally connected thereto and extended outwardly from said other side of said base plate adjacent the opposite ends thereof and overlying opposite edges of said one side wall so as to confine said one side wall therebetween, said clamping means including means extending within the hollow interior of said element from said first named portions and positioned against the surface of said side wall opposite to said flat surface to thereby confine said bumper element between said other side of said base plate and said means.

3. The structure of claim 2 wherein said base plate is sectionally formed and is adjustable in length.

4. The structure of claim 2 wherein said clamping means includes a pair of spaced clamping members, each clamping member including a portion extending laterally outwardly from said other side of said base plate and a portion extending generally parallel thereto, the second named portions of said members extending toward one another with the rear wall of said bumper engaged between said other portions and said other side of said base plate.

5. The structure of claim 2 wherein said clamping means includes a retaining bar fixed to said other side of said base plate, said retaining bar extending through the hollow interior of said bumper element, the rear wall of said bumper element being held between said retaining bar and said base plate.

6. The structure of claim 2 wherein said base plate includes rearwardly extending legs, and mounting means for said assembly are fixed to said legs.

References Cited by the Examiner

UNITED STATES PATENTS

| | | | |
|---|---|---|---|
| 2,054,838 | 9/36 | Short | 293—71 |
| 2,117,121 | 5/38 | Urquhart et al. | 114—219 |
| 2,624,596 | 1/53 | Clingman | 293—71 X |
| 2,659,595 | 11/53 | Coda | 267—63 X |
| 2,896,762 | 7/59 | Stansbury | 267—1 X |
| 2,935,855 | 5/60 | Reid | 267—1 X |
| 3,014,710 | 12/61 | Layne | 267—1 |

ARTHUR L. LA POINT, *Primary Examiner.*